(12) United States Patent
Zhang (10) Patent No.: US 12,476,544 B2
(45) Date of Patent: Nov. 18, 2025

(54) SWITCHING CONVERTER

(71) Applicant: SG MICRO CORP, Beijing (CN)

(72) Inventor: Haibo Zhang, Beijing (CN)

(73) Assignee: SG MICRO CORP, Beijing (CN)

( * ) Notice: Subject to any disclaimer, the term of this patent is extended or adjusted under 35 U.S.C. 154(b) by 201 days.

(21) Appl. No.: 18/577,781

(22) PCT Filed: Aug. 18, 2022

(86) PCT No.: PCT/CN2022/113213
§ 371 (c)(1),
(2) Date: Jan. 9, 2024

(87) PCT Pub. No.: WO2023/001315
PCT Pub. Date: Jan. 26, 2023

(65) Prior Publication Data
US 2024/0322692 A1    Sep. 26, 2024

(30) Foreign Application Priority Data

Jul. 22, 2021 (CN) .......................... 202110831179.5

(51) Int. Cl.
*H02M 3/156* (2006.01)
*H02M 1/00* (2007.01)
(Continued)

(52) U.S. Cl.
CPC ....... *H02M 3/1588* (2013.01); *H02M 1/0009* (2021.05); *H02M 1/0025* (2021.05);
(Continued)

(58) Field of Classification Search
CPC ............. H02M 1/0003; H02M 1/0009; H02M 1/0025; H02M 1/0035; H02M 1/0058;
(Continued)

(56) References Cited

U.S. PATENT DOCUMENTS

| 5,528,125 A | 6/1996 | Marshall et al. |
| 6,724,174 B1 * | 4/2004 | Esteves ................. H02M 3/155 323/224 |

(Continued)

FOREIGN PATENT DOCUMENTS

| CN | 101123395 A | 2/2008 |
| CN | 101123395 B | 6/2012 |

(Continued)

OTHER PUBLICATIONS

International Search Report and Written Opinion for International Application No. PCT/CN2022/113213, dated Oct. 27, 2022, 8 pages.

*Primary Examiner* — Thienvu V Tran
*Assistant Examiner* — Shahzeb K Ahmad
(74) *Attorney, Agent, or Firm* — Westman, Champlin & Koehler, P.A.

(57) ABSTRACT

A switching converter includes a power circuit, a control circuit, and a regulation circuit. The power circuit regulates an output current through the load with at least one main switching transistor. The control circuit couples to the power circuit and controls on and off states of the at least one main switching transistor in accordance with a reference voltage received to control a minimum peak inductor current through an inductor. The regulation circuit provides the reference voltage to the control circuit and adaptively regulates the reference voltage in accordance with the input voltage and the output voltage. An effect of a duty ratio on an inductor current can be canceled out when the duty cycle changes due to fluctuations in the input and output voltages. An output current is kept approximately constant in a burst mode, thereby effectively reducing output ripple and noise.

12 Claims, 7 Drawing Sheets

(51) Int. Cl.
   *H02M 1/14*      (2006.01)
   *H02M 3/158*     (2006.01)
(52) U.S. Cl.
   CPC ........... *H02M 1/0035* (2021.05); *H02M 1/14* (2013.01); *H02M 3/156* (2013.01)
(58) Field of Classification Search
   CPC ............ H02M 1/08; H02M 1/14; H02M 1/32; H02M 3/156; H02M 3/158; H02M 3/1582; H02M 3/1584; H02M 3/1586; H02M 3/1588; Y02B 70/10
   See application file for complete search history.

(56) References Cited

U.S. PATENT DOCUMENTS

| | | | |
|---|---|---|---|
| 7,990,120 B2* | 8/2011 | Leonard | H02M 3/156 323/224 |
| 9,236,801 B2 | 1/2016 | Ouyang | |
| 10,186,948 B2 | 1/2019 | Moon et al. | |
| 10,193,455 B2 | 1/2019 | Moon et al. | |
| 10,374,516 B2 | 8/2019 | Moon et al. | |
| 10,693,379 B2 | 6/2020 | Moon et al. | |
| 11,563,335 B2 | 1/2023 | Luo et al. | |
| 2008/0030178 A1 | 2/2008 | Leonard et al. | |
| 2014/0097814 A1* | 4/2014 | Brewster | H02M 3/156 323/282 |
| 2014/0160601 A1 | 6/2014 | Ouyang | |
| 2015/0244274 A1* | 8/2015 | Fahlenkamp | H02M 3/33592 363/21.15 |
| 2018/0054111 A1 | 2/2018 | Moon et al. | |
| 2018/0054130 A1 | 2/2018 | Moon et al. | |
| 2018/0054133 A1 | 2/2018 | Moon et al. | |
| 2018/0054134 A1 | 2/2018 | Moon et al. | |
| 2021/0091678 A1* | 3/2021 | Wang | H02M 1/4208 |
| 2021/0226470 A1 | 7/2021 | Luo et al. | |
| 2023/0223780 A1 | 7/2023 | Luo et al. | |
| 2023/0231469 A1* | 7/2023 | Lee | H02M 3/158 323/271 |

FOREIGN PATENT DOCUMENTS

| | | |
|---|---|---|
| CN | 102957303 A | 3/2013 |
| CN | 103326574 A | 9/2013 |
| CN | 103872746 A | 6/2014 |
| CN | 204721219 U | 10/2015 |
| CN | 105024542 A | 11/2015 |
| CN | 111261956 A | 6/2020 |
| CN | 107769567 B | 12/2020 |

\* cited by examiner

FIG. 1

PRIOR ART

FIG. 2

PRIOR ART

FIG. 3

PRIOR ART

FIG. 4

PRIOR ART

SWITCHING CONVERTER

CROSS-REFERENCES TO RELATED APPLICATION

This application is a Section 371 National Stage application of International Application No. PCT/CN2022/113213, filed on Aug. 18, 2022, which published as WO 2023/001315 A1, on Jan. 26, 2023, not in English, and claims priority to the Chinese patent application No. 202110831179.5, filed on Jul. 22, 2021, and entitled "SWITCHING CONVERTER", the entire contents of which are incorporated herein by reference in their entireties.

FIELD OF TECHNOLOGY

The present disclosure relates to the technical field of electronic circuits, in particular to a switching converter.

BACKGROUND

Modern portable electronic devices are often provided with a power source, such as a battery, which supplies a direct current (DC) to various electronic components within the device. However, these components typically have different voltage requirements. One or more voltage converters are typically needed for various electronic components to decrease a nominal voltage associated with the power source to a voltage suitable for the various electronic components.

A conventional voltage converter is typically one of two types, linear regulators and switching converters. In a linear regulator, an output voltage is regulated by adjusting a passive component, such as a variable resistor, to control a continuous flow of current from a voltage source to a load. A switching converter controls an output voltage by connecting or disconnecting a current, and typically includes one or more switches and inductive and capacitive components for storing and transferring energy to the load side. A regulator regulates a magnitude of the voltage delivered to the load side by controlling on and off states of the switching elements to control an amount of power which is delivered in the form of discontinuous current pulses through the inductor. An inductor and a capacitor convert the delivered current pulses into a stabilized load current, so as to regulate the load voltage. Finally, an output voltage is regulated by adjusting on and off times of the switching elements in accordance with feedback signals representing an output voltage and a load current.

A switching converter operating in a current mode has been widely used, because of its good linearity, load transient signal rejection, and current limiting capability during fault conditions (e.g., output short-circuit). A current-mode DC-DC converter typically monitors an inductor current and compares it to a peak inductor current to determine the moment when a main switching element is turned off, thereby eliminating current being excessively delivered.

A current-mode switching converter circuit typically includes the following units: a logic unit: an output switch controlled by the logic unit: an oscillator for providing a periodic timing signal to turn on a main switch: a current amplifier for providing a sense voltage in accordance with an inductor current: an error amplifier which adjusts an output voltage in accordance with a load state; and a current comparator for generating a signal to control the moment when the main switch is turned off, in accordance with a comparison result of the sense voltage and a voltage from the current amplifier in a predetermined manner.

A switching converter typically exhibits higher efficiency, which is defined as a ratio of an output voltage to an input voltage, than a linear regulator, with undesired heat dissipation being greatly reduced. However, the efficiency of the switching converter is not always maximized, but varies proportionally with the load. The efficiency of the switching converter depends on an output current. In a case that the load is reduced, the switching losses and internal losses of the switching converter will not decrease. Consequently, the efficiency of the switching converter is decreased.

The above-mentioned efficiency loss at light load is a common phenomenon in a switching converter operating in a forced continuous mode. In the forced continuous mode, the main switch of the switching converter is periodically turned on and off regardless of the load state, and therefore the efficiency loss is greater at lighter load.

A switching converter operating in a forced continuous mode may have an effective alternative which allows the switching converter to operate in a burst mode. When operating in this mode, a regulator will ignore switching cycles at light load, thereby reducing switching loss of transistors. For example, in the burst mode, active switching elements, and optionally some parts of the converter circuit that are not needed, are kept being in an off state when a load current decreases to a predetermined value, thereby reducing internal and switching losses of the circuit and increasing the efficiency of the circuit.

The switching converter, if being capable of operating in a burst mode, typically has the same circuitry as a conventional switching converter, except for additional burst comparator and similar circuitry to provide a burst threshold level. In a case that an output load falls below a predetermined value, an output voltage is increased by charging with a predetermined output current, and then an output feedback voltage is higher than a reference voltage, triggering the burst mode in which some portions of the circuit are turned off to reduce power consumption.

A drawback of the conventional switching converter operating in a burst mode is that a superimposed signal of a sampled current and a ramp compensation signal is compared with a minimum clamp voltage to control the moment when a main switch is turned off in the circuit. A slope voltage component depends on a duty cycle. The longer an on time is, the larger the slope voltage component, and the smaller a peak inductor current is. In a case that the minimum clamp voltage has a constant value in the burst mode, the smaller a duty ratio is, and the larger a ripple voltage is, which generates a large noise or even is unacceptable in the application.

SUMMARY

In view of this, it is an object of the present disclosure to provide a switching converter, which can adaptively adjust a minimum peak inductor current of the switching converter according to an input voltage and an output voltage when the switching converter operates in a burst mode, so that an output current is kept approximately constant in the burst mode, thereby effectively reducing output ripple and noise.

According to an aspect of the present disclosure, there is provided a switching converter comprising: an input terminal for receiving an input voltage: an output terminal coupled to a load to provide an output voltage: a power circuit coupled to the input terminal and the output terminal, the power circuit regulating an output current through the load with an inductor and at least one main switching transistor; a control circuit coupled to the power circuit, for controlling on and off states of the at least one main switching transistor in accordance with a reference voltage being received to control a minimum peak inductor current through the inductor, and a regulation circuit coupled to the control circuit, for providing the reference voltage to the control circuit, the regulation circuit adaptively regulating the reference voltage in accordance with the input voltage and the output voltage when the switching converter operates in a burst mode.

Optionally, the regulation circuit regulates the reference voltage such that the reference voltage is positively correlated with a difference between the output voltage and the input voltage.

Optionally, the control circuit comprises: a logic circuit for controlling on and off states of the at least one main switching transistor; an oscillator for providing a clock signal to the logic circuit for controlling an on time of the at least one main switching transistor.

Optionally, the control circuit further comprises: an error amplifier for comparing a feedback voltage of the output voltage with a reference voltage to obtain an error signal, the error amplifier changing the error signal according to a load state: a burst clamping unit for comparing the error signal with a reference voltage, and determining a clamp voltage representing a minimum peak inductor current according to a comparison result; and a current comparator for comparing a superimposed signal of a current sampling signal and a slope compensation signal with the clamp voltage, and controlling an off moment of the at least one switching transistor according to a comparison result.

Optionally, the control circuit further comprises: a burst comparator for comparing the error signal with a predetermined burst threshold voltage, and controlling the switching converter to enter a burst mode when the error signal is less than the burst threshold voltage.

Optionally, the burst clamping unit is configured to set the clamp voltage equal to the reference voltage when the error signal is smaller than the reference voltage, and to set the clamp voltage equal to the error signal when the error signal is larger than or equal to the reference voltage.

Optionally, the regulation circuit comprises: a transconductance amplifier having two input terminals for respectively receiving the input voltage and the output voltage and for converting a voltage difference between the input voltage and the output voltage into current information; a first resistor having a first end coupled to an output terminal of the transconductance amplifier, and a voltage follower having one input terminal for receiving the reference voltage, and another input terminal and an output terminal, both of which are coupled to a second end of the first resistor, wherein an intermediate node between the transconductance amplifier and the first resistor is used to provide a compensated reference voltage to the burst clamping unit.

Optionally, the control circuit further comprises: a sampling transistor and a sampling resistor for sampling an inductor current through the at least one main switching transistor, and a current amplifier for obtaining a current sampling signal by generating a sensing voltage across the sampling resistor.

Optionally, the power circuit further comprises at least one synchronous switching transistor, the synchronous switching transistor being turned on and off in a manner complementary to the main switching transistor.

Optionally, the control circuit further comprises: a reversal-current comparator which monitors a current through the synchronous switching transistor when the switching converter operates in a burst mode, and which turns off the synchronous switching transistor when the inductor current is reversed.

Optionally, the switching converter is one selected from a group consisting of a buck-type converter, a boost-type converter, or a buck-boost-type converter.

Optionally, the switching converter is a synchronous switching converter or an asynchronous switching converter.

The switching converter according to the embodiment of the present disclosure comprises a regulation circuit coupled with a control circuit, and the regulation circuit is used for adaptively regulating a minimum peak inductor current of the switching converter according to an input voltage and an output voltage when the switching converter operates in a burst mode. Therefore, an output current is kept approximately constant in the burst mode, thereby effectively reducing output ripple and noise.

BRIEF DESCRIPTION OF THE DRAWINGS

The above and other objects, features and advantages of the present disclosure will become more apparent from the following description of embodiments of the present disclosure with reference to the accompanying drawings.

DESCRIPTION OF THE EMBODIMENTS

Various embodiments of the present disclosure will be described in more detail below with reference to the accompanying drawings. Throughout the various figures, like elements are denoted by the same or similar reference numerals. For the sake of clarity, various parts in the drawings are not drawn to scale, moreover, some well-known parts may not be shown.

Numerous specific details of the present disclosure, such as structures, materials, dimensions, processes, and techniques of elements, are set forth in the following description in order to provide a clearer understanding of the present disclosure. It will be understood by those skilled in the art that the present disclosure may be practiced without these specific details.

It should be understood that in the following description, the term "circuit" refers to a conductive loop formed by at least one component or sub-circuit through an electrical or electromagnetic connection. When a component or circuit is "connected" to another component, or a component/circuit is "connected" between two nodes, it may be directly connected or coupled to another component, or there may be an intermediate element, and the connection between the components may be physical, logical, or a combination thereof. Conversely, when a component is to be "directly coupled" or "directly connected" to another component, it means that there is no intermediate element between them.

In the present application, a transistor blocks current and/or passes substantially no current when the transistor is in an "off state" or being "turned off". Conversely, the transistor is able to conduct current significantly when the transistor is in an "on state" or being "turned on,". For example, in one embodiment, a high-voltage transistor comprises an N-channel metal oxide semiconductor (NMOS) field effect transistor (FET), with a first terminal (i.e., drain) and a second terminal (i.e., source) of the transistor being applied with a high voltage between the first terminal and the second terminal. In some embodiments, an integrated controller circuit may be configured to drive a power switch when regulating the energy provided to the load. Moreover, in the present disclosure, the term "ground" or "ground potential" in this application refers to a reference voltage or a potential with respect to which all other voltages or potentials of an electronic circuit or an integrated circuit (IC) are defined or measured.

Figure 1:
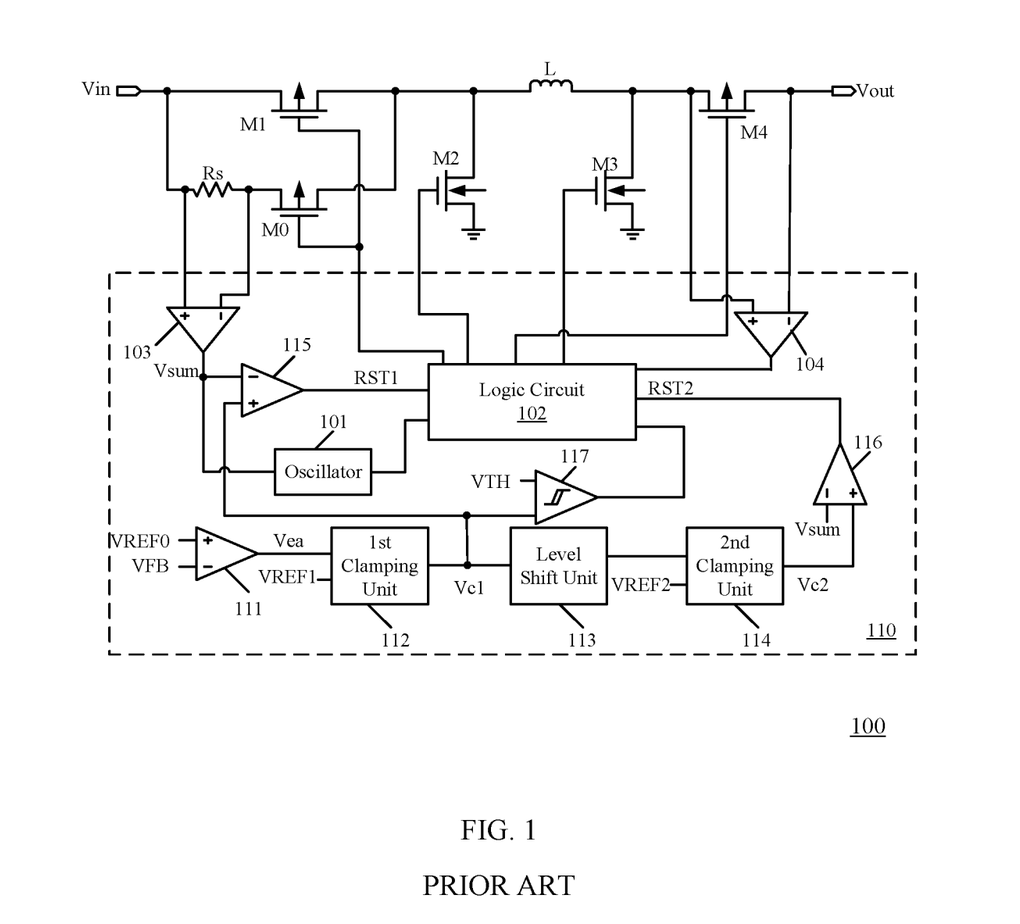
FIG. 1 shows a schematic circuit diagram of a conventional buck-boost switching converter with a burst mode.

FIG. 1 shows a conventional buck-boost switching converter with a burst mode. As shown in FIG. 1, a power circuit of the switching converter 100 is implemented with a buck-boost topology and comprises transistors M1-M4 and an inductor L. The transistor M1, the inductor L and the transistor M4 are coupled in sequence between an input terminal and an output terminal of the switching converter. The transistor M2 is coupled between an intermediate node of the transistor M1 and the inductor L and ground. The transistor M3 is coupled between an intermediate node of the transistor M4 and the inductor L and ground. The transistors M1, M2 and the inductor L constitute a buck circuit in the switching converter, and the transistors M3, M4 and the inductor L constitute a boost circuit in the switching converter.

A control circuit 110 is configured to control on and off states of the transistors M1-M4 in the power circuit to control the inductor to output energy in discrete pulses. The control circuit 110 includes an oscillator 101, a logic circuit 102, a current amplifier 103, and a reversal-current comparator 104. The oscillator 101 is configured to provide an internal clock for switching timing of the circuit, and to generate a saw-tooth wave for a PWM comparator, and to provide a compensation signal for a slope compensation circuit. The logic circuit 102 is configured to realize the logic control function of the system, process logic signals of various units which control on and off states of the transistors M1-M4, and generate switch driving signals to be provided to the transistors M1-M4. The logic circuit 102 may include a pulse width modulator (PWM) circuit, or any other suitable circuit capable of controlling duty cycle of the power switches M1-M4.

When the input voltage Vin is higher than the output voltage Vout, the switching converter 100 operates in a buck mode, the transistor M3 is in an off state, the transistor M4 is in an on state, and the transistors M1 and M2 are alternately turned on and off. The transistor M1 is also called a main switching transistor, and the transistor M2 is also called a synchronous switching transistor. When the main switching transistor M1 is turned on, the current amplifier 103 indirectly samples the main switching transistor M1 with a sampling transistor M0. An inductor current flows through a sampling resistor Rs and generates a sensing voltage across the sampling resistor Rs. The sensing voltage is approximately equal to a product of the inductor current and a resistance value of the sampling resistor, and is then amplified by the current amplifier 103 to obtain a current sampling signal. When a superimposed signal Vsum of the current sampling signal and the slope compensation signal exceeds a voltage at a non-inverted input terminal of a current comparator 115 (i.e., a clamp voltage Vc1 output from a first clamping unit 112), the current comparator 115 provides a first reset signal RST1 to the logic circuit 102 to control the main switching transistor M1 to be turned off and the synchronous switching transistor M2 to be turned on.

Similarly, when the input voltage Vin is lower than the output voltage Vout, the switching converter 100 operates in a boost mode. The transistor M1 is in an on state, the transistor M2 is in an off state, and the transistors M3 and M4 are alternately turned on and off. Similarly, the transistor M3 is also referred to as a main switching transistor, and the transistor M4 is also referred to as a synchronous switching transistor. When the main switching transistor M3 is turned on, the current comparator 116 compares the superimposed signal Vsum of the current sampling signal and the slope compensation signal with the voltage at the non-inverted input terminal (i.e., the clamp voltage Vc2 output from a second clamping unit 114). When the superimposed signal Vsum is higher than the voltage at the non-inverted input terminal, the current comparator 116 provides a second reset signal RST2 to the logic circuit 102 to control the main switching transistor M3 to be turned off and the synchronous switching transistor M4 to be turned on.

Further, a level shift unit 113 shifts the clamp voltage Vc1 output from the first clamping unit 112 and provides the shifted voltage signal to the second clamping unit 114, and the second clamping unit 114 generates the clamp voltage Vc2 according to the received voltage signal.

The switching converter in FIG. 1 has two modes, a continuous operation mode and a burst mode. In the continuous operation mode, the switching converter can reduce noise, RF interference, and output voltage ripple. In the burst mode, the main switching transistor and the synchronous switching transistor are turned on intermittently at light load, so as to have higher efficiency which is obtained by reducing switching losses and quiescent current of the circuit at light load.

In the burst mode, a reversal-current comparator 104 is activated and the inductor current is not allowed to be negative. The reversal-current comparator 104 monitors the inductor current through the synchronous switching transistor M4 and provides a signal to the logic circuit 102 to turn off the synchronous switching transistor M2 or M4 when the inductor current is reversed.

In the burst mode, the first clamp unit 112 and the second clamp unit 114 provide fixed clamp voltages Vc1 and Vc2 to set a minimum peak inductor current level, and then the burst comparator 117 monitors the error signal to determine when to activate or deactivate the burst mode.

Figure 2:
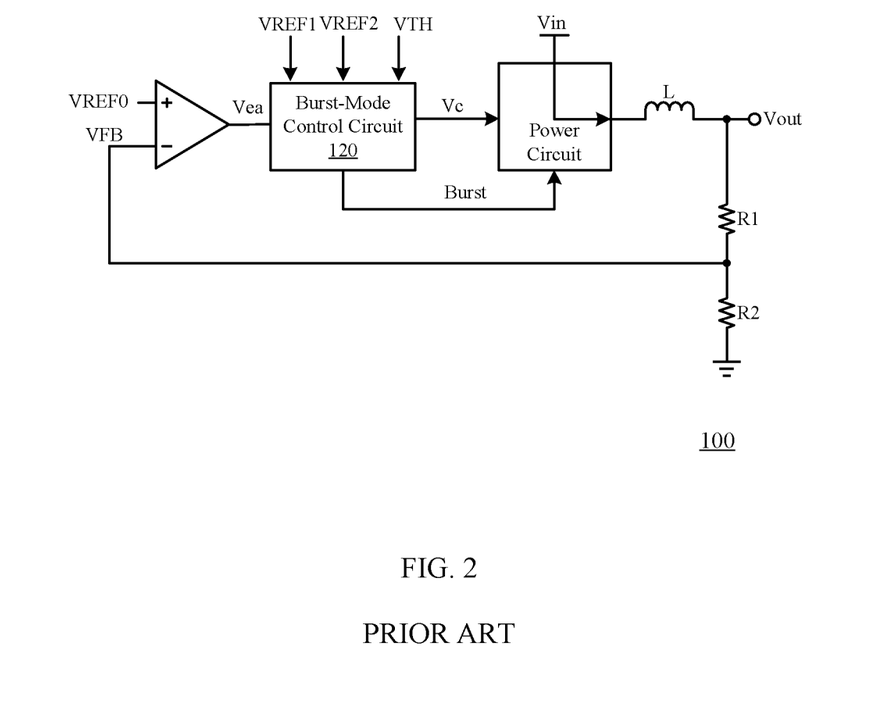
FIG. 2 shows a schematic diagram of a conventional buck-boost switching converter with a burst mode.

Referring to FIG. 2, the conventional switching converter 100 utilizes a burst-mode control circuit 120 to clamp a minimum clamp voltage Vc so as to charge the inductor L with a minimum peak current in the burst mode. When a load current is less than the minimum peak current, an output voltage Vout is increased by charging with the predetermined minimum peak current. When a feedback voltage VFB is higher than a reference voltage VREF0, an error signal Vea between the feedback voltage VFB and the reference voltage VREF0 decreases. When the error signal Vea is less than a threshold voltage VTH, the burst mode Burst is activated to shut down the system. When a load current increases to a predetermined value, the burst mode is deactivated, all circuits are turned on, and normal operation is restored.

A drawback of the conventional switching converter 100 is that the clamp voltage for the burst mode is fixed in the switching converter. Since the burst clamp voltage fixes the minimum peak inductor current during each switching cycle, output voltage ripple is also fixed. For a high burst clamp voltage, the efficiency is highest at light load, at the expense of larger output voltage ripple. For a low burst clamp voltage, output voltage ripple is smaller, but the efficiency is decreased for light load.

Figure 3:
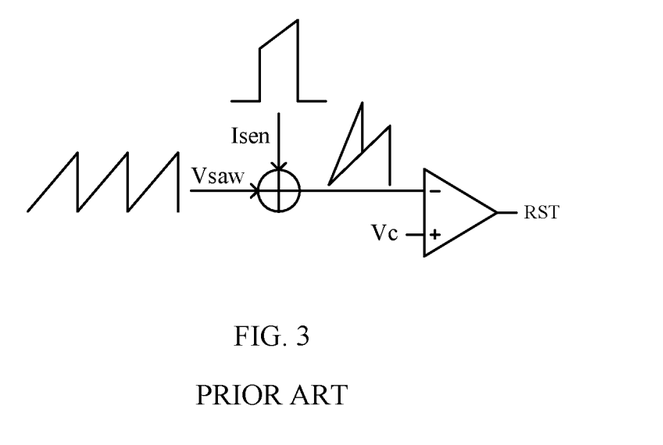
FIG. 3 shows a schematic diagram illustrating an operation principle of a burst comparator of FIG. 1.
Figure 4:
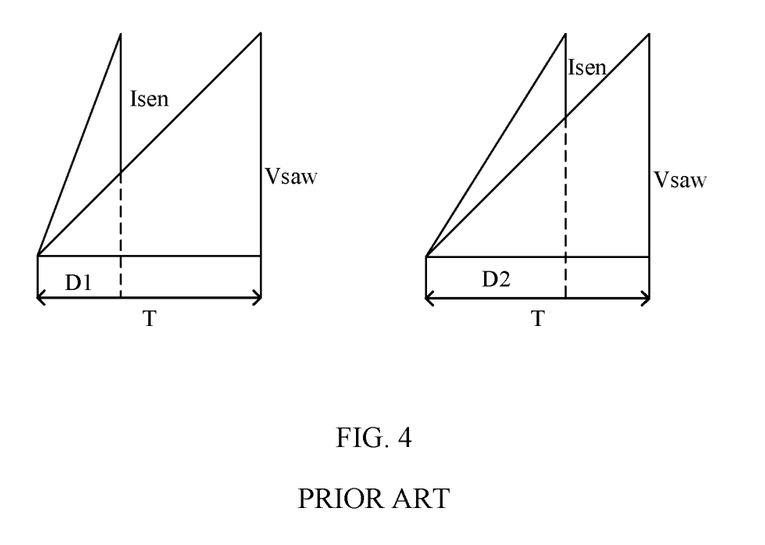
FIG. 4 shows a schematic diagram illustrating a superposition principle of a current sampling signal and a slope compensation signal.

Moreover, referring to FIG. 3 and FIG. 4, a current comparator in the conventional switching converter 100 compares a superimposed signal of a current sampling signal Isen and a slope compensation signal Vsaw with the clamp voltage Vc to determine when to turn off the main switching transistor. However a slope voltage component depends on a duty ratio D, thereby obtaining:

$$Vc = Isen + Vslope(D)$$

When the switching converter 100 is in the burst mode of the buck mode, Vc=VREF1. When the switching converter 100 is in the burst mode of the boost mode, Vc=VREF2. Thus, the following formula is obtained:

$$Isen = VREF1(VREF2) - Vslope(D)$$

The current sampling signal Isen represents a peak current of the inductor. It can be seen from the above formula that under the same clamp voltage Vc, the smaller the duty cycle of the switch is, the smaller the slope voltage component is, and the larger the current Isen for reversing the comparator is, resulting in a larger output voltage ripple. Therefore, when the clamp voltage Vc is fixed, the smaller the switching duty ratio D of the conventional switching converter 100 in the burst mode is, the larger the output voltage ripple is. Thus, the conventional switching converter 100 is not suitable for an application environment with a small duty ratio.

Figure 5:
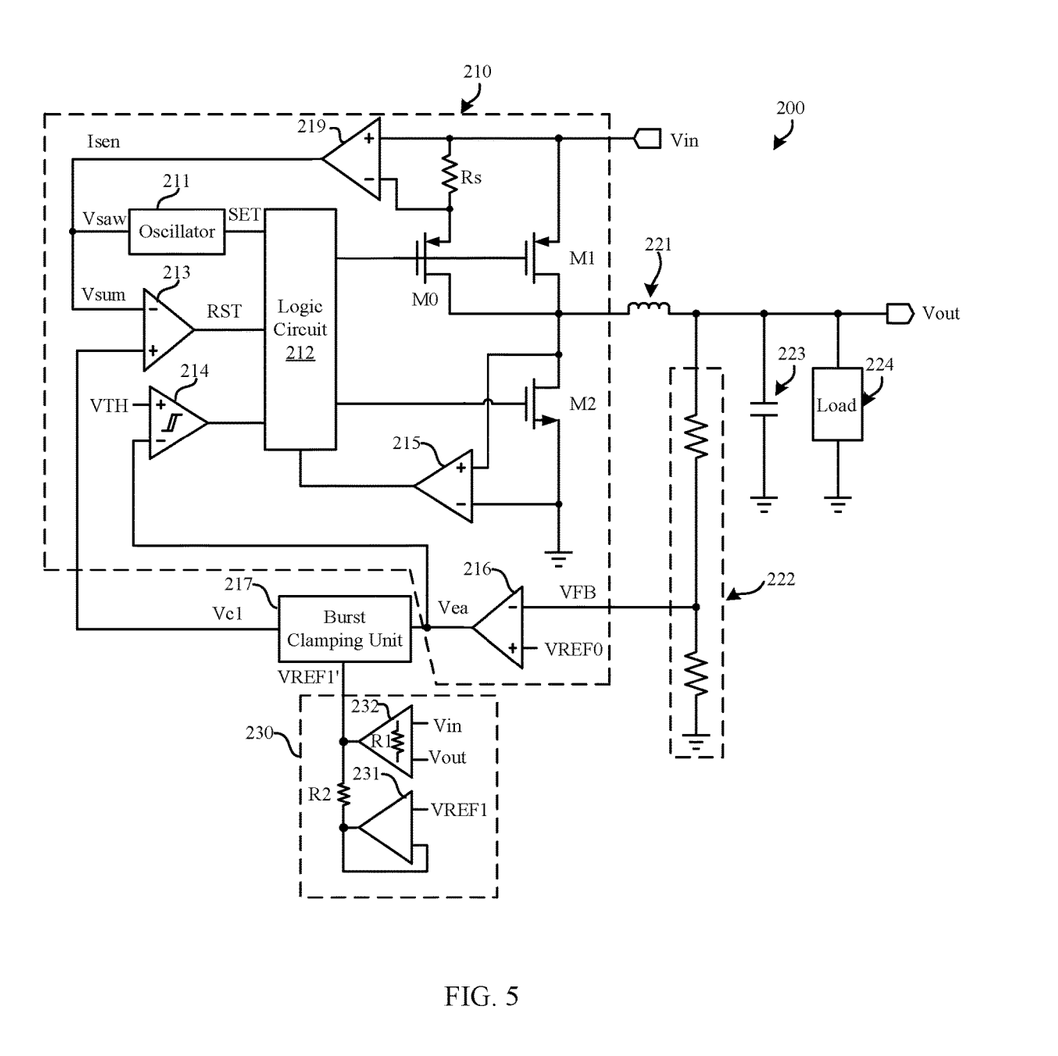
FIG. 5 shows a schematic circuit diagram of a switching converter according to a first embodiment of the present disclosure.

FIG. 5 shows a schematic circuit diagram of a switching converter according to a first embodiment of the present disclosure. The switching converter 200 in FIG. 5 includes a control circuit 210 and an external power circuit. The power circuit includes one or more switch and filter elements (e.g., inductors, capacitors, and the like) which are configured to regulate the transfer of power from an input terminal to an output terminal of the switching converter in response to one or more switching driving signals from the control circuit 210. In some embodiments, one or more switches in the power circuit are integrated with the control circuit 210 to form an integrated circuit chip.

The switching converter 200 may be classified into a buck-type converter, a boost-type converter, a flyback converter, and a buck-boost-type converter according to the topology of the power circuit. The buck-type converter is described in detail hereinafter as an example.

In the context of the present embodiment, the switching converter 200 may operate in and changes among a plurality of modes, including, but not limited to, a continuous operation mode and a burst mode. In the continuous operation mode, the switching converter can reduce noise, RF interference, and output voltage ripple. In the burst mode, at least one switch in the power circuit is turned on and off at a fixed frequency for short durations as needed to maintain an output voltage level. These short durations of switching may be referred to as "burst on" periods, or burst on intervals. Between adjacent ones of the short durations, the switch may be disabled, and portions of the circuitry in the controller may be temporarily disabled, to reduce power consumption. These durations of disabling the switch may be referred to as "burst off" durations or burst off intervals. On and off control in this manner is often referred to as "burst mode" and/or "burst mode". By turning on the switch intermittently under light load, the switching loss and quiescent current of the circuit under light load can be reduced, and higher efficiency can be obtained.

When operating in a continuous operation mode, an oscillator 211 provides switching timing, or any other suitable device is capable of providing switching timing for the circuit (i.e., by generating narrow pulses at a constant frequency). The oscillator 211 provides a narrow pulse of the clock signal SET to the logic circuit 212 at the beginning of each cycle. The logic circuit 212 turns on the main switching transistor M1 and turns off the synchronous switching transistor M2 according to the received clock signal SET. The logic circuit 212 may include a pulse width modulator (PWM) circuit, or any other suitable circuit capable of controlling a duty cycle (i.e., an amount of time period during which the main switching transistor M1 is turned on compared to a time period of a switching cycle) of the main switching transistor M1 in a power circuit. As a result, a voltage across the inductor 221 is approximately equal to Vin-Vout, a current through the inductor 221 increases linearly, and a larger amount of current is delivered to a capacitor 223 and a load 224. When the main switching transistor M1 is turned on, the inductor current through the main switching transistor M1 is indirectly sampled by the sampling transistor M0. An inductor current flows through a sampling resistor Rs, to generate a sensing voltage across the sampling resistor Rs, which is approximately equal to the product of the inductor current and the sampling resistor value. Then, the voltage is amplified by a current amplifier 219 to obtain a current sampling signal Isen. When a superimposed signal Vsum of the current sampling signal Isen and a slope compensation signal Vsaw exceeds a voltage at a non-inverted input terminal of the current comparator 213, which is an output of a burst clamping unit 217, the current comparator 213 provides a reset signal RST to the logic circuit 212, so that the main switching transistor M1 is turned off and the synchronous switching transistor M2 is turned on. This causes that the voltage across the inductor 221 changes to −Vout, i.e. decrease of the inductor current, until a next clock signal turns on the main switching transistor M1 and turns off the synchronous switching transistor M2 again.

It should be noted that although a MOSFET is mentioned as an example of a switching element in the present embodiment, any other type of suitable switching element may be used without departing from the principles of the present invention. Moreover, although this embodiment is described with a synchronous switching converter, the present disclosure is not limited thereto. The present disclosure is also applicable to an asynchronous switching converter, and those skilled in the art may also use a rectifier diode to replace the synchronous switching transistor M2 in the above embodiment.

In the burst mode, the burst clamping unit 217 fixes a clamp voltage Vc1 at a predetermined reference voltage, thereby setting a minimum peak inductor current level. Specifically, the burst clamping unit 217 compares the error signal Vea with the reference voltage VREF1. When the error signal Vea is smaller than the reference voltage VREF1, the clamp voltage Vc1 is equal to the reference voltages VREF1. When the error signals Vea is greater than or equal to the reference voltage VREF1, the clamp voltage Vc1 is equal to the error signals Vea. The burst comparator 214 monitors the error signal Vea to determine when to activate or deactivate the burst mode. When an output load current is less than a predetermined value, an output voltage is increased by charging with a predetermined minimum peak inductor current, and then a feedback voltage VFB is greater than a reference voltage VREF0, and the error signal Vea is decreased. When the error signal Vea is less a burst threshold voltage VTH, the burst comparator 214 outputs a logic high level for activating the burst mode such that the main switching transistor M1, the synchronous switching transistor M2, and predetermined components of the remaining circuits are all turned off to reduce power consumption. When the output voltage drops, a voltage of the error signal Vea increases above a level, which is set by the burst comparator 214 in a hysteresis manner, so that the burst comparator 214 outputs a logic low level, for deactivating the burst mode, turning on all circuits, and returning to normal operation.

In the burst mode operation, a reversal-current comparator 215 is activated for preventing the inductor current from being negative. The reversal-current comparator 215 monitors a current through the synchronous switching transistor M2 and provides a signal to the logic circuit 212 to turn off the synchronous switching transistor M2 when the inductor current is in a reversal-current state. In the example of FIG. 5, the reversal-current state represents when the current passes through a zero current level. However, those skilled in the art will appreciate that the scope of the present disclosure includes other reversal-current states, for example, indicating that the current is approaching or has crossed a zero current level. For example, a voltage offset may be applied at an inverting input terminal of the reversal-current comparator 215 so that the reversal-current comparator 215 turns off the synchronous switching transistor M2 just before the inductor current or a switch current crosses the zero current threshold.

The switching converter 200 according to the present disclosure further includes a regulation circuit 230 for compensating the reference voltage of the burst clamping unit 217 according to a functional relationship between the input voltage Vin and the output voltage Vout, so as to cancel an effect of a duty ratio in the burst mode and maintain a current in the burst mode to be constant, so as to reduce output ripple and noise of the switching converter in the burst mode.

Specifically, as shown in FIG. 5, the regulation circuit 230 includes a voltage follower 231, a transconductance amplifier 232, and a resistor R2 coupled between the voltage follower 231 and the transconductance amplifier 232. Two input terminals of the transconductance amplifier 232 respectively receive the input voltage Vin and the output voltage Vout, and are used for converting a voltage difference between the input voltage Vin and the output voltage Vout into current information, which is applied to one end of the resistor R2. The other end of the resistor R2 is coupled to an output terminal of the voltage follower 231 which is implemented with an operational amplifier. An input terminal of the voltage follower 231 is coupled to an output terminal. According to the principle of virtual short of an operational amplifier, a voltage at the output terminal is equal to that at the input terminal, so that a voltage, which is equal to the reference voltage VREF1, is applied to the other end of the resistor R2. Therefore, a compensated reference voltage is approximately equal to a difference between the reference voltage VREF1 and a product of the current information output from the transconductance amplifier 232 and the resistor R2, that is:

$$VREF1' = VREF1 - (Vin - Vout) \times R2/R1$$

where R1 represents a resistance value of the transconductance amplifier 232, and R2 represents a resistance value of the resistor R2.

It can be seen from the above formula that the compensated reference voltage in the switching converter 200 according to the present disclosure carries voltage difference information between the input voltage and the output voltage. When a duty ratio changes due to fluctuation of the input voltage and the output voltage, the compensated reference voltage can cancel an effect of the duty ratio. Therefore, an output current is kept approximately constant in the burst mode, thereby effectively reducing output ripple and noise.

Figure 6:
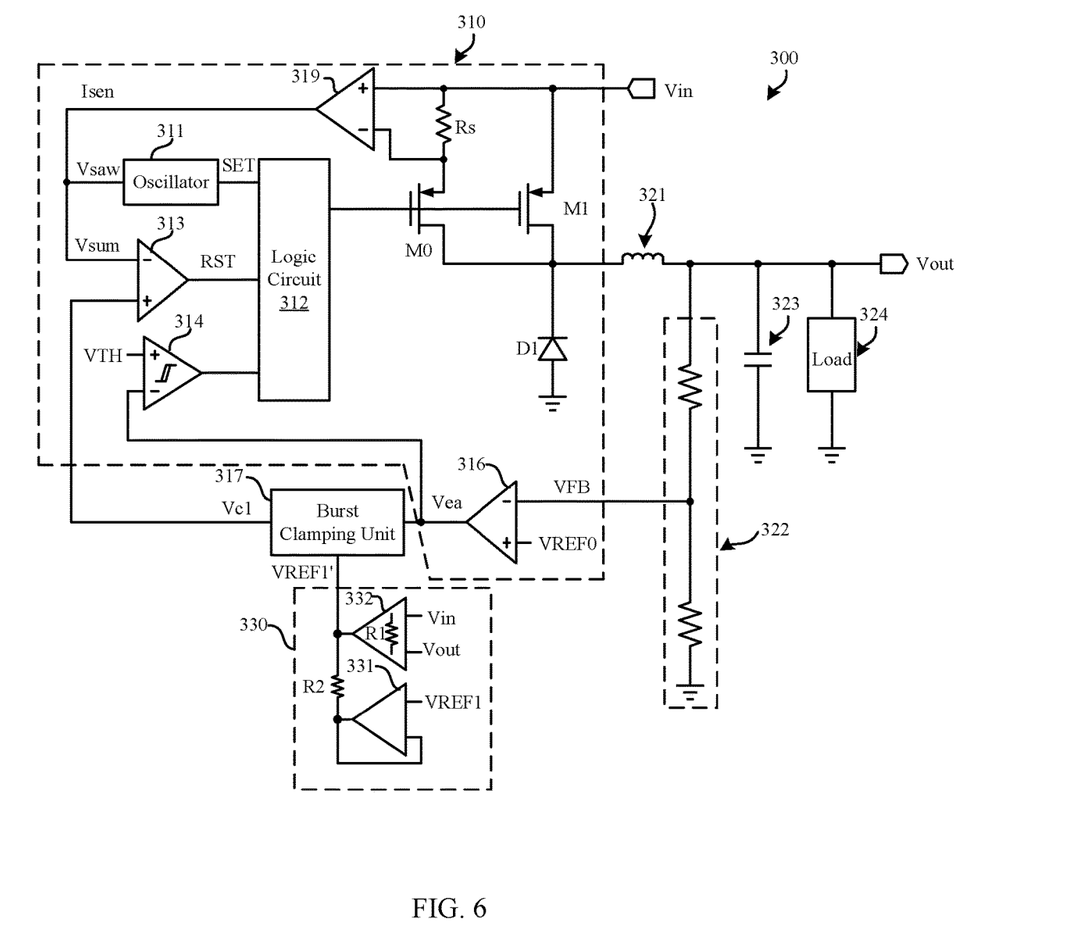
FIG. 6 shows a schematic circuit diagram of another switching converter according to a first embodiment of the present disclosure.

FIG. 6 shows a schematic circuit diagram of another switching converter according to a first embodiment of the present disclosure. Unlike FIG. 5, FIG. 6 shows an asynchronous switching converter 300 which differs from a synchronous switching converter in that a synchronous switching transistor M2 is replaced by a rectifier diode D1, which prevents an output capacitor 323 from discharging to ground. Except for that, the remaining elements in FIG. 6 have the substantially the same functions as the corresponding elements described above in FIG. 5.

It should be noted that although FIGS. 5 and 6 illustrate the embodiments of a buck synchronous switching converter and a buck asynchronous switching converter, respectively, the present disclosure is not limited to these embodiments. The advantages of the present disclosure are equally applicable to other types of converters, such as boost synchronous switching converter, boost asynchronous switching converter, buck-boost switching converter, and other suitable types of converters.

Figure 7:
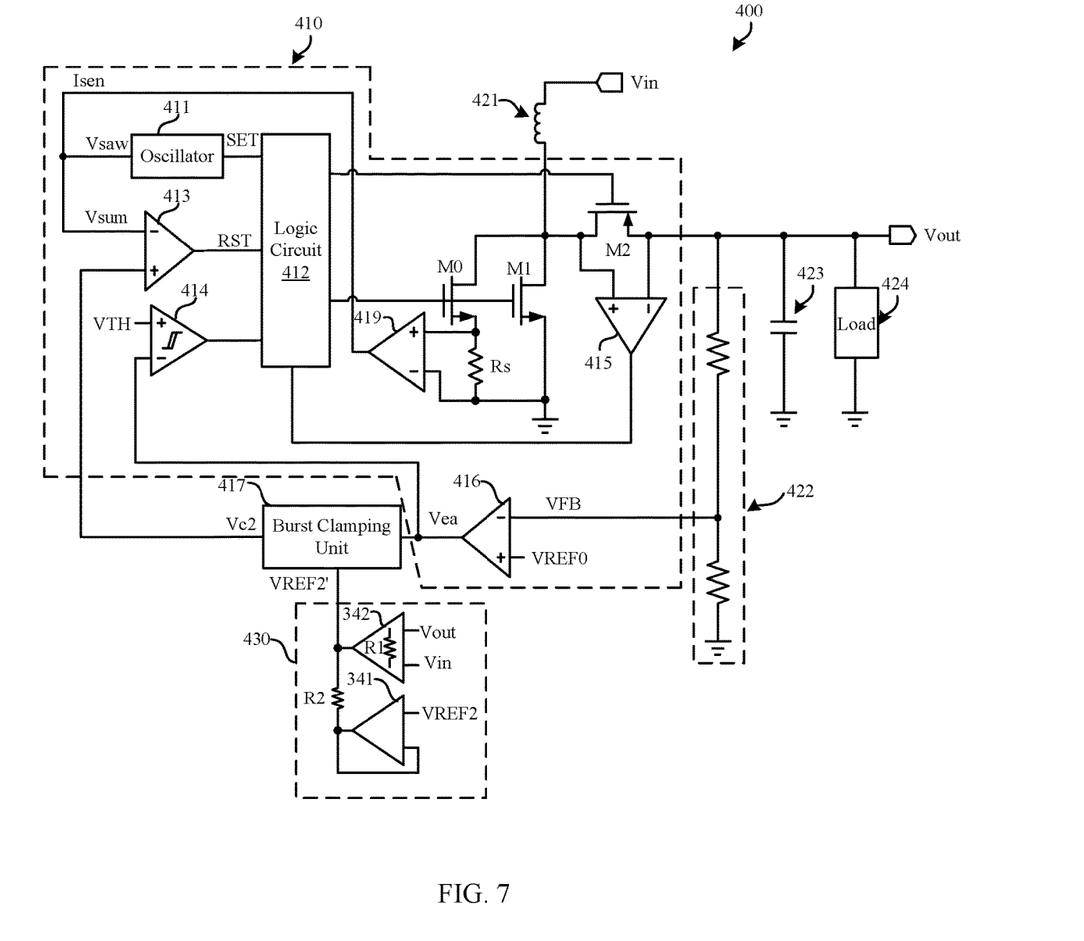
FIG. 7 shows a schematic circuit diagram of a switching converter according to a second embodiment of the present disclosure.

FIG. 7 shows a schematic circuit diagram of a switching converter according to a second embodiment of the present disclosure. FIG. 7 shows a boost synchronous switching converter which includes many components the same as those being presented in the buck-type converter shown in FIG. 5. A control circuit 410 of the boost-type converter shown in FIG. 7 operates as follows.

When a circuit condition results in that a main switching transistor M1 is turned on and a synchronous switching transistor M2 is turned off, an input voltage Vin is applied across an inductor 421. During this charging phase, a current begins to flow through the inductor 421, while the synchronous switching transistor M2 prevents an output capacitor 423 from discharging to ground. Moreover, the output capacitor 423 has the function of delivering current to the load 424.

Once the main switching transistor M1 is turned off and the synchronous switching transistor M2 is turned on, the output capacitor 423 is charged by the energy stored in the inductor 421. In such case, additional current begins to flow through a load to increase an output voltage Vout. After a predetermined time period, the main switching transistor M1 is turned on again. The cycle is repeated to maintain the desired output voltage level and delivering the required current to the load as required.

The remaining circuit components in FIG. 7 operate the same as mentioned above for the circuit components shown in FIG. 5. A current comparator 413 compares a superimposed signal Vsum of a current sampling signal Isen from the current amplifier 419 and a slope compensation signal Vsaw with an error signal Vean output from an error amplifier 416, and provides a reset signal RST to a logic circuit 412 according to the comparison result, so as to determine the moment when to turn off a main switching transistor M1 and turn on a synchronous switching transistor M2.

Likewise, the switching converter 400 of FIG. 7 may also operate in and changes among a plurality of modes, including, but not limited to, a continuous operation mode and a burst mode. In the burst mode, a burst clamping unit 417 fixes a clamp voltage Vc2 at a predetermined reference voltage, thereby setting a minimum peak inductor current level. Specifically, the burst clamping unit 417 compares an error signal Vea with the reference voltage VREF2' which is compensated by a regulation circuit 430. When the error signal Vea is less than the compensated reference voltage VREF2', the clamp voltage Vc2 is equal to the reference voltage. When the error signal Vea is greater than or equal to the reference voltage VREF2', the clamp voltage Vc1 is equal to the error signal Vea. Then, a burst comparator 414 monitors the error signal Vea to determine the moment when to activate or deactivate the burst mode. When an output load current is less than a predetermined value, an output voltage is increased by charging with a predetermined minimum peak inductor current. Then, a feedback voltage VFB is greater than a reference voltage VREF0, and the error signal Vea is decreased. When the error signal Vea is less than a burst threshold voltage VTH, the burst comparator 414 outputs a logic high level for activating the burst mode such that the main switching transistor M1, the synchronous switching transistor M2, and predetermined components of the remaining circuits are all turned off to reduce power consumption. When the output voltage drops, a voltage of the error signal Vea increases above a level which is set by the burst comparator 414, causing burst comparator 214 in a hysteresis manner, so that the burst comparator 414 outputs a logic low level, for deactivating the burst mode, turning on all circuits, and returning to normal operation.

Moreover, in the burst mode, the regulation circuit 430 compensates the reference voltage VREF2 according to a functional relationship between the input voltage Vin and the output voltage Vout, so as to cancel an effect of a duty ratio in the burst mode, and maintain a current in the burst mode to be constant all the time, so as to reduce output ripple and noise of the switching converter in the bust mode.

Similarly, the regulation circuit 430 includes a voltage follower 441, a transconductance amplifier 442, and a resistor R2 coupled between the voltage follower 441 and the transconductance amplifier 442. Two input terminals of the transconductance amplifier 442 respectively receive the input Vin and the output voltage Vout, and are used for converting a voltage difference between the input Vin and the output voltage Vout into current information, which is applied to one end of the resistor R2. The other end of the resistor R2 is coupled to an output terminal of the voltage follower 441, which is implemented with an operational amplifier. One input terminal of the voltage follower 441 is coupled to the reference voltage VREF2, and the other input terminal of the voltage follower 441 is coupled to an output terminal. According to the principle of virtual short of an operational amplifier, a voltage at the output terminal is equal to that at the input terminal, so that a voltage, which is equal to the reference voltage VREF2, is applied to the other end of the resistor R2. Therefore, a compensated reference voltage is approximately equal to a difference between the reference voltage VREF2 and a product of the current information output from the transconductance amplifier 442 and the resistor R2, that is, $$VREF2' = VREF2 - (Vout - Vin) \times R2/R1$$

where R1 represents a resistance value inside the transconductance amplifier 442, and R2 represents a resistance value of the resistor R2.

It can be seen from the above formula that the compensated reference voltage in the switching converter 400 according to the present disclosure carries voltage difference information between the input voltage and the output voltage. In such manner, a minimum peak inductor current level can be adjusted according to the input voltage and the output voltage. Thus, when a duty ratio changes due to fluctuation of the input voltage and the output voltage, the compensated reference voltage can cancel an effect of the duty ratio on the inductor current. Therefore, an output current is kept approximately constant in the burst mode, thereby effectively reducing output ripple and noise.

Figure 8:
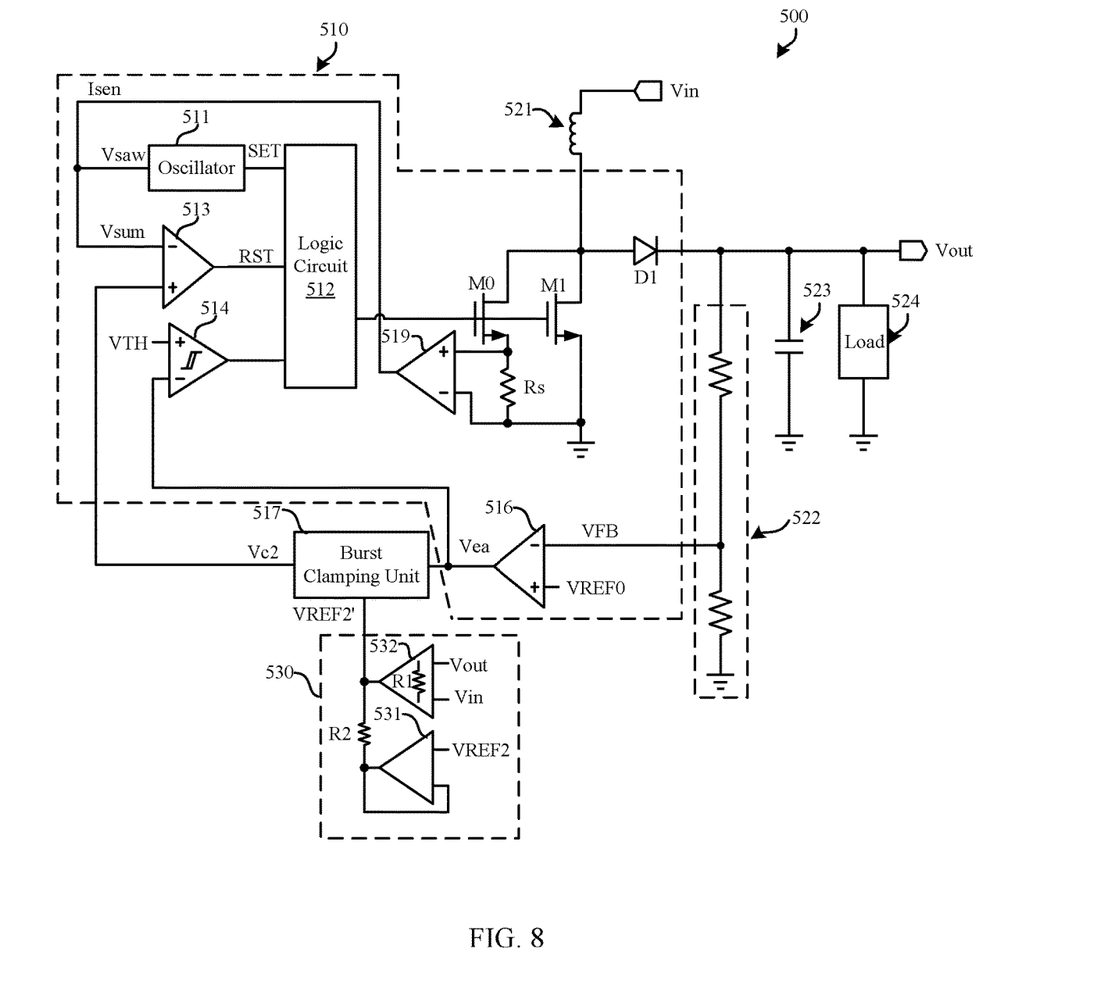
FIG. 8 shows a schematic circuit diagram of another switching converter according to a second embodiment of the present disclosure.

FIG. 8 shows a schematic circuit diagram of another switching converter according to a second embodiment of the present disclosure. Unlike FIG. 7, FIG. 8 shows an asynchronous switching converter 500 which differs from a synchronous switching converter in that a synchronous switching transistor M2 is replaced by a rectifier diode D1, which prevents an output capacitor 523 from discharging to ground. Except for that, the remaining elements in FIG. 8 have the substantially the same functions as the corresponding elements described above in FIG. 7.

In the above embodiments, although the switching converters of the buck topology and the boost topology are respectively described with reference to FIGS. 5 to 8, it can be understood that the control circuit with the burst mode and the burst compensation function according to the embodiments of the present disclosure can also be used in the switching converters of other topologies, including, but are not limited to, buck-type, boost-type, buck-boost-type, non-inverting buck-boost-type, forward-type, flyback-type, and other topologies.

In summary, the switching converter according to the embodiment of the present disclosure comprises a regulation circuit coupled with a control circuit, and the regulation circuit is used for adaptively regulating a minimum peak inductor current of the switching converter according to an input voltage and an output voltage when the switching converter operates in a burst mode. Thus, an effect of a duty ratio on an inductor current can be canceled when the duty ratio changes due to fluctuation of the input voltage and the output voltage. Therefore, an output current is kept approximately constant in the burst mode, thereby effectively reducing output ripple and noise.

It should be noted that relational terms, such as "first", "second", and the like, are used herein solely to distinguish one entity or operation from another entity or operation, without necessarily requiring or implying any such actual relationship or order between such entities or operations. Moreover, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Without any further restriction, the statement "including a . . . " means that there is an element in the process, method, article or apparatus, without excluding the presence of another identical element.

While embodiments according to the present disclosure are described above, these embodiments are not exhaustive of all details, nor are the disclosure limited to the specific embodiments described. Obviously, many modifications and variations are possible in light of the above description. These embodiments were chosen and described in detail in order to best explain the principles of the disclosure and its practical application ground, to thereby enable others skilled in the art to best utilize the disclosure and to make modifications of the disclosure ground. The disclosure is to be limited only by the claims and their full scope and equivalents.

What is claimed is:

1. A switching converter comprising:
   an input terminal for receiving an input voltage;
   an output terminal coupled to a load to provide an output voltage;
   a power circuit coupled to the input terminal and the output terminal, the power circuit regulating an output current through the load with an inductor and at least one main switching transistor;
   a control circuit coupled to the power circuit, for controlling on and off states of the at least one main switching transistor in accordance with a reference voltage being received to control a minimum peak inductor current through the inductor, and
   a regulation circuit coupled to the control circuit, for providing the reference voltage to the control circuit, the regulation circuit adaptively regulating the reference voltage in accordance with the input voltage and the output voltage when the switching converter operates in a burst mode.

2. The switching converter according to claim 1, wherein the regulation circuit regulates the reference voltage such that the reference voltage is positively correlated with a difference between the output voltage and the input voltage.

3. The switching converter according to claim 1, wherein the control circuit comprises:
   a logic circuit for controlling on and off states of the at least one main switching transistor;
   an oscillator for providing a clock signal to the logic circuit for controlling an on time of the at least one main switching transistor.

4. The switching converter according to claim 3, wherein the control circuit further comprises:
   an error amplifier for comparing a feedback voltage of the output voltage with a reference voltage to obtain an error signal, the error amplifier changing the error signal according to a load state;
   a burst clamping unit for comparing the error signal with a reference voltage, and determining a clamp voltage representing a minimum peak inductor current according to a comparison result; and
   a current comparator for comparing a superimposed signal of a current sampling signal and a slope compensation signal with the clamp voltage, and controlling an off moment of the at least one switching transistor according to a comparison result.

5. The switching converter according to claim 4, wherein the control circuit further comprises:
   a burst comparator for comparing the error signal with a predetermined burst threshold voltage, and controlling the switching converter to enter a burst mode when the error signal is less than the burst threshold voltage.

6. The switching converter according to claim 4, wherein the burst clamping unit is configured to set the clamp voltage equal to the reference voltage when the error signal is smaller than the reference voltage, and to set the clamp voltage equal to the error signal when the error signal is larger than or equal to the reference voltage.

7. The switching converter according to claim 4, wherein the regulation circuit comprises:
   a transconductance amplifier having two input terminals for respectively receiving the input voltage and the output voltage and for converting a voltage difference between the input voltage and the output voltage into current information;
   a first resistor having a first end coupled to an output terminal of the transconductance amplifier, and
   a voltage follower having one input terminal for receiving the reference voltage, and another input terminal and an output terminal, both of which are coupled to a second end of the first resistor,
   wherein an intermediate node between the transconductance amplifier and the first resistor is used to provide a compensated reference voltage to the burst clamping unit.

8. The switching converter according to claim 4, wherein the control circuit further comprises:
   a sampling transistor and a sampling resistor for sampling an inductor current through the at least one main switching transistor, and
   a current amplifier for obtaining a current sampling signal by generating a sensing voltage across the sampling resistor.

9. The switching converter according to claim 3, wherein the power circuit further comprises at least one synchronous switching transistor, the synchronous switching transistor being turned on and off in a manner complementary to the main switching transistor.

10. The switching converter according to claim 9, wherein the control circuit further comprises:
    a reversal-current comparator which monitors a current through the synchronous switching transistor when the switching converter operates in a burst mode, and which turns off the synchronous switching transistor when the inductor current is reversed.

11. The switching converter according to claim 1, wherein the switching converter is one selected from a group consisting of a buck-type converter, a boost-type converter, or a buck-boost-type converter.

12. The switching converter according to claim 1, wherein the switching converter is a synchronous switching converter or an asynchronous switching converter.

* * * * *